(12) United States Patent
Wahlsten et al.

(10) Patent No.: US 9,095,910 B2
(45) Date of Patent: Aug. 4, 2015

(54) CUTTING INSERT WITH SYMMETRICAL, RADIUSED CUTTING EDGES

(75) Inventors: Daniel Wahlsten, Fagersta (SE); Rachid Msaoubi, Fagersta (SE); Hindrik Engstrom, Soderbarke (SE); Carlos Bueno-Martinez, Vasteras (SE)

(73) Assignee: SECO TOOLS AB, Fagersta (SE)

( * ) Notice: Subject to any disclaimer, the term of this patent is extended or adjusted under 35 U.S.C. 154(b) by 176 days.

(21) Appl. No.: 13/982,754

(22) PCT Filed: Jan. 17, 2012

(86) PCT No.: PCT/EP2012/050623
§ 371 (c)(1),
(2), (4) Date: Jul. 31, 2013

(87) PCT Pub. No.: WO2012/104140
PCT Pub. Date: Aug. 9, 2012

(65) Prior Publication Data
US 2013/0315682 A1 Nov. 28, 2013

(30) Foreign Application Priority Data
Feb. 3, 2011 (EP) .................................. 11153153

(51) Int. Cl.
*B23B 5/00* (2006.01)
*B23B 27/16* (2006.01)
*B23B 27/14* (2006.01)
*B23B 5/20* (2006.01)

(52) U.S. Cl.
CPC ........... *B23B 27/1611* (2013.01); *B23B 27/141* (2013.01); *B23B 2200/0447* (2013.01); *B23B 2200/0461* (2013.01); *B23B 2200/245* (2013.01); *Y10T 407/23* (2015.01)

(58) Field of Classification Search
CPC ................... B23B 2200/0423; B23B 2200/08; B23B 2200/082; B23B 2200/083; B23B 2200/208; B23B 2200/3645; B23B 2200/20; B23C 2200/04; B23C 2200/0416; B23C 2200/08; B23C 2200/083; B23C 2200/126; B23C 2200/366
See application file for complete search history.

(56) References Cited

U.S. PATENT DOCUMENTS

| RE26,168 E | * | 3/1967 | Lundgren | 407/114 |
| 3,882,580 A | * | 5/1975 | Lundgren | 407/116 |
| 5,032,049 A | * | 7/1991 | Hessman et al. | 407/113 |
| 5,449,255 A | * | 9/1995 | Katbi et al. | 407/114 |
| 5,957,629 A | * | 9/1999 | Hessman et al. | 407/113 |
| 2010/0129167 A1 | * | 5/2010 | Morrison | 407/114 |

FOREIGN PATENT DOCUMENTS

| EP | 0654317 A1 | 5/1995 |
| SU | 1060321 A1 | 12/1983 |
| WO | 2010035870 A1 | 4/2010 |

* cited by examiner

*Primary Examiner* — Will Fridie, Jr.
(74) *Attorney, Agent, or Firm* — Corinne R. Gorski

(57) ABSTRACT

A cutting insert includes a top surface, an edge surface and a cutting edge between the top and edge surfaces. The cutting edge is symmetrical about a centerline. The cutting edge has a first edge radius at a first point at the centerline of the cutting edge and a different, second edge radius at second points on opposite sides of and remote from the centerline of the cutting edge. The first edge radius is larger than the second edge radius. The top surface includes a land surface between the cutting edge and a remaining portion of the top surface. The land surface defines a surface that is distinct from the remaining portion of the top surface. A width of the land surface behind the cutting edge at the first point at the center of the cutting edge is different than the width of the land surface behind the second points.

13 Claims, 10 Drawing Sheets

CUTTING INSERT WITH SYMMETRICAL, RADIUSED CUTTING EDGES

RELATED APPLICATION DATA

This application is a §371 National Stage Application of PCT International Application No. PCT/EP2012/050623 filed Jan. 17, 2012 claiming priority of European Application No. 11153153.9, filed Feb. 3, 2011.

BACKGROUND AND SUMMARY

The present invention relates generally to cutting inserts and, more particularly, to cutting inserts having radiused cutting edges.

The optimal sharpness of a cutting edge in a cutting tool often depends upon the nature of the material being cut. For softer material, a sharp edged tool may be preferable while, for harder materials, a sharp edge may be too easily broken. For harder materials, it is known to hone or round the cutting edge. However, too large of a hone can increase cutting forces and tool temperatures. Conventional wisdom is that the hone should be about one-third to one-half the size of the feed. See Kennedy, A Better Edge, Conicity Technologies (http://www/conicity.com/betteredge.htm).

Ordinarily, hones are applied uniformly along a tool's cutting edge. However, cutting conditions can vary greatly along a cutting edge. At the leading edge, the uncut chip thickness is heaviest and the edge requires maximum protection. At the tool's trailing edge, uncut chip thickness decreases to near zero while the hone remains the same size. Chip thickness at the trailing edge is smaller than the hone, so the cutting edge removes material inefficiently, which can increase friction, cutting forces, temperature, and wear rate. Conventional wisdom suggests that it is desirable that the edge radius should be smaller on the tool corner radius because the uncut chip thickness decreases along the corner radius. See Kennedy, A Better Edge, Conicity Technologies (http://www/conicity.com/betteredge.htm).

In those handful of tools that do provide cutting edges with edge radii that are larger near the corner, such as SU1060321, on which the preamble of claim 1 is based, US2001/0135406, or EP0654317, the insert geometries tend to be rather simplistic, with the radiused edges transitioning directly into flat top surfaces. Such inserts are not designed to facilitate chip removal, and can risk damage to more vulnerable portions of the cutting edge.

During metal cutting operations, such as those using cutting tools with replaceable cutting inserts, so-called "notch wear" can occur which will adversely affect the surface texture of the workpiece and eventually weaken the cutting edge. As explained in Modern Metal Cutting, A Practical Handbook, pp IV-15, IV-25 (1994 Sandvik Coromant), notch wear on the trailing edge is a typical adhesion wear but can to some extent also result from oxidation wear. The notch will be formed where the cutting edge and the material part. The wear is thus very localized at the end of the cut where air can get to the cutting zone. Notch wear on the leading edge is mechanical, often with harder materials. In addition to oxidation, the causes of notch wear can include excessive cutting speed and insufficient wear resistance, and remedies can include reducing cutting speed, use of more wear resistant grade cutting inserts, and special coatings. It is desirable to provide alternative techniques for controlling notch wear.

In accordance with an aspect of the present invention, a cutting insert comprises a cutting edge, the cutting edge being symmetrical about a centerline, the cutting edge having a first edge radius at a first point at the centerline of the cutting edge and a different, second edge radius at second points on opposite sides of and remote from the centerline of the cutting edge.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1A:
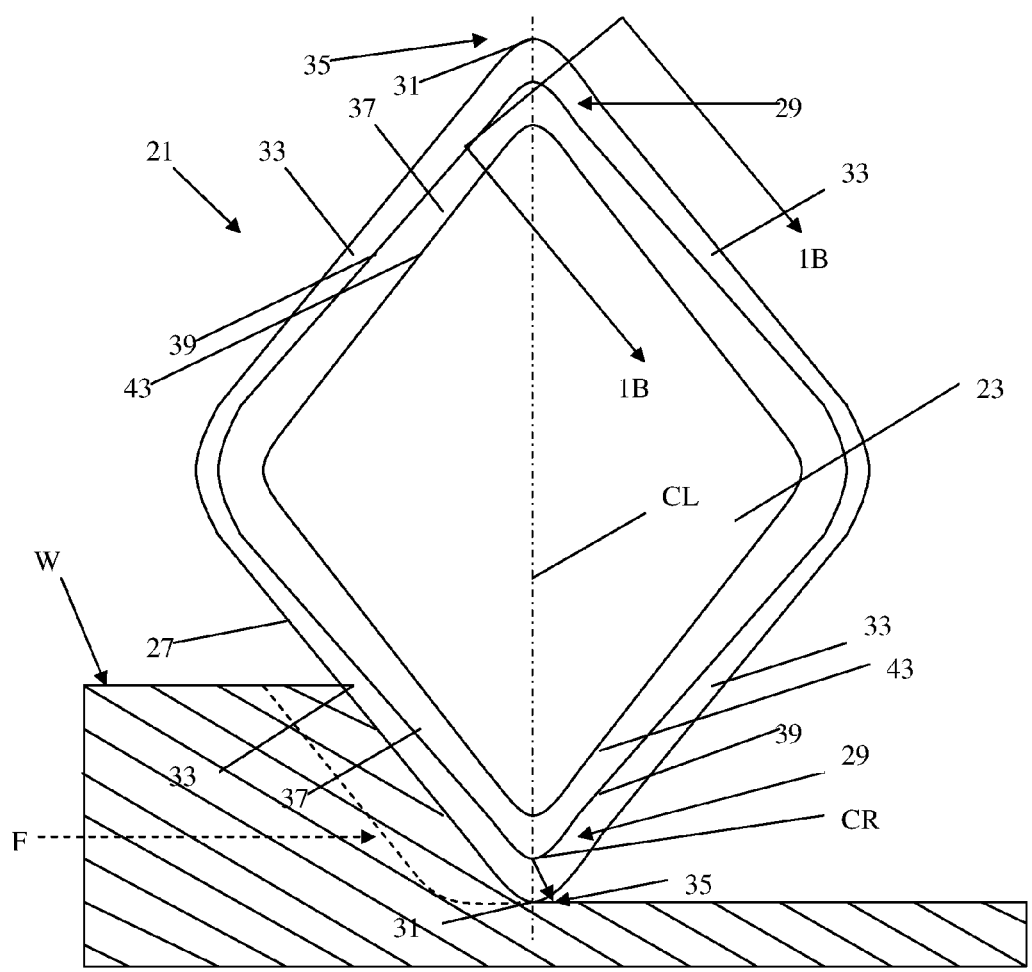
FIGS. 1A and 1B are a top view of a cutting insert according to an aspect of the present invention and a side, cross-sectional view taken at Section 1B-1B of the cutting insert of FIG. 1A, respectively.
Figure 1B:
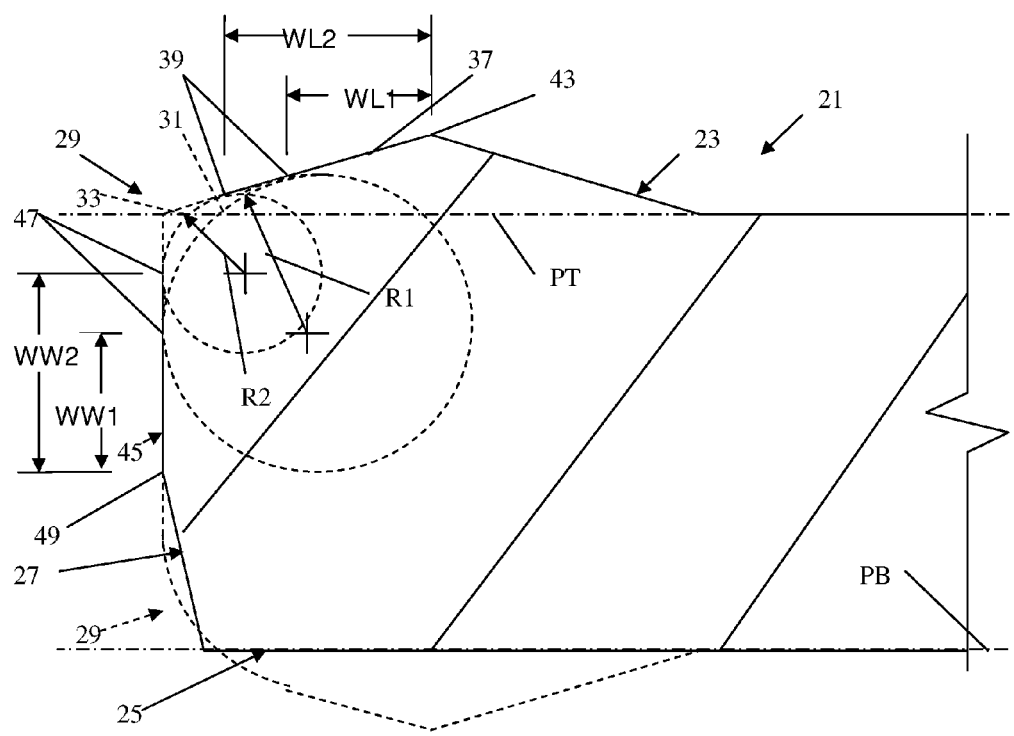

A cutting insert 21 according to an aspect of the present invention is shown in FIGS. 1A and 1B. As seen in FIG. 1B, the cutting insert 21 comprises a top surface 23, a bottom surface 25, and at least one edge surface 27 between the bottom surface and the top surface. The top surface 23, the bottom surface 25, and the edge surface 27 can comprise additional surfaces, including land surfaces, chipbreaker surfaces, clearance surfaces, wiper surfaces, support surfaces, etc.

The insert 21 comprises at least one cutting edge 29 at the intersection of the top surface 23 and the edge surface 27. In double-sided inserts, a cutting edge 29 will be present at the intersection of the bottom surface and the edge surface as shown in phantom in FIG. 1B. The cutting edge 29 is radiused and, for purposes of discussion, shall be considered to have an inner end 39 tangent with the top surface 23 and a bottom end 47 tangent with the edge surface 27, however, it will be appreciated that the inner and bottom ends of the cutting edge need not be tangent with the top and edge surfaces.

As seen in FIG. 1A, the cutting edge 29 is symmetrical about a centerline CL bisecting the cutting edge. As seen in FIG. 1B, the cutting edge 29 has a first edge radius R1 (shown in phantom in FIG. 1B) at a point 31 at or near the centerline CL of the cutting edge and (as seen in phantom in FIG. 1B) a different, second edge radius R2 at second points 33 on opposite sides of and remote from the centerline of the cutting edge. While the cutting edge 29 can extend beyond the second points 33, for purposes of discussion it will be assumed that the second points define the ends of the working portion of the cutting edge. The edge radii can be formed in any suitable manner, such as by a brushing operation. Preferably, a maximum of the first edge radius R1 is at least two times larger than a maximum of the second edge radius R2.

FIG. 1A shows the insert 21 as it might appear during cutting of a workpiece W, such as during a turning operation with feed F. In such an operation, one of the second points 33 is at the leading edge of the insert, and the point 31 is at the trailing edge. By making the cutting edge 29 symmetrical about the centerline CL, the insert 21 can be used to cut in the opposite direction from that illustrated in FIG. 1A so that a different one of the second points 33 is at the leading edge of the insert, while the same point 31 is still at the trailing edge. For example, the insert 21 can be used in a manner in which it is moved back and forth relative to a workpiece. The point 31 need not, however, be at the trailing edge of the working portion of the cutting edge 29. For example, during a grooving or cut-off operation in which the cutting insert 21 is moved generally in the direction of the centerline CL, the point 31 is not at the trailing edge of the working portion of the cutting edge 29.

By appropriate selection of cutting edge radii R1 and R2 for a given application, notch wear on the inserts can be affected. Ordinarily, by reducing edge radius at the ends of the cutting edge, i.e., at second points 33, notch length is reduced. Ordinarily, by increasing edge radius at the ends of the cutting edge, notch width is reduced. The manipulated edge radii improve the surface finish by obtaining a long notch length and a narrow notch width.

It will be observed that providing different radii at different locations along the cutting edge 29 can result in the location of the cutting edge changing relative to the original location of the cutting edge, i.e., before providing a radiused cutting edge. If it is desired to have the cutting edge follow a particular shape, such as a straight line, after providing the radius, the shape of the cutting edge before providing the radii can be designed to accommodate the different radii so that the finished shape has the desired geometry.

FIGS. 2B-4 are magnified photographs showing notch wear for cutting inserts having different cutting edge radii. The geometry of each insert was DCMT11T304-F1, grade CMP (coated cermet), where DCMT11T304 is the standard ISO denomination (ISO 1832:2004) which determines the shape of the insert, the clearance angle, the tolerance of the dimensions, etc. F1 is the name of the used chipbreaker. CMP is a grade of cermets.

The material chosen for the tests was 528Q steel (annealed). The cutting data chosen were Vc=250 m/min, ap=0.5 mm, and f=0.15 mm/rev with continuous cutting conditions (6 minutes), where Vc is cutting speed, i.e. the rate at which the uncut surface of the work passes the cutting edge of the tool; ap is the depth of cut, i.e. the thickness of metal removed from the metal work piece measured in a radial direction; and F is the feed, i.e. the distance moved by the tool in an axial direction at each revolution of the work piece. The cutting data selected for the test represent a common finishing operation in continuous machining. The edges of the inserts are in continuous contact with the material during the machining time (6 minutes in this case).

Figure 2A:
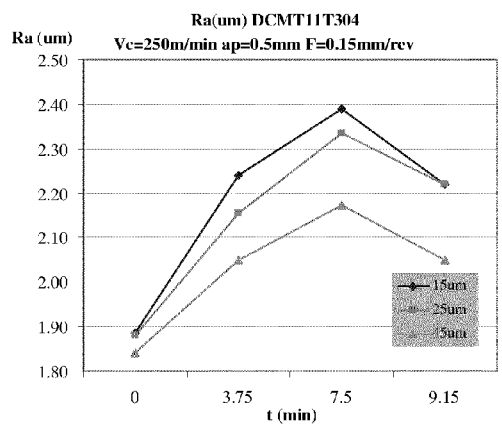
FIG. 2A is a graph of surface finish over machining time of inserts shown in FIGS. 2B, 3, and 4.

FIG. 2A shows a graph disclosing surface finish values (Ra) for the steel DIN 51CRMo4 when machined with three different inserts according to the invention. The surface finish (Ra in μm) has been measured after 0, 3.75, 7.5 and 9.15 minutes. The results shown in the graph at FIG. 2A relate to inserts shown in FIGS. 2B, 3 and 4. The graph shows machined time on the x axis and surface finish values Ra on the y-axis. A conclusion from the graph is that the surface finish is improved when the radius R2 at the end of the usable working portion of the cutting edge is 45 μm as compared to 15 μm.

Figure 2B:
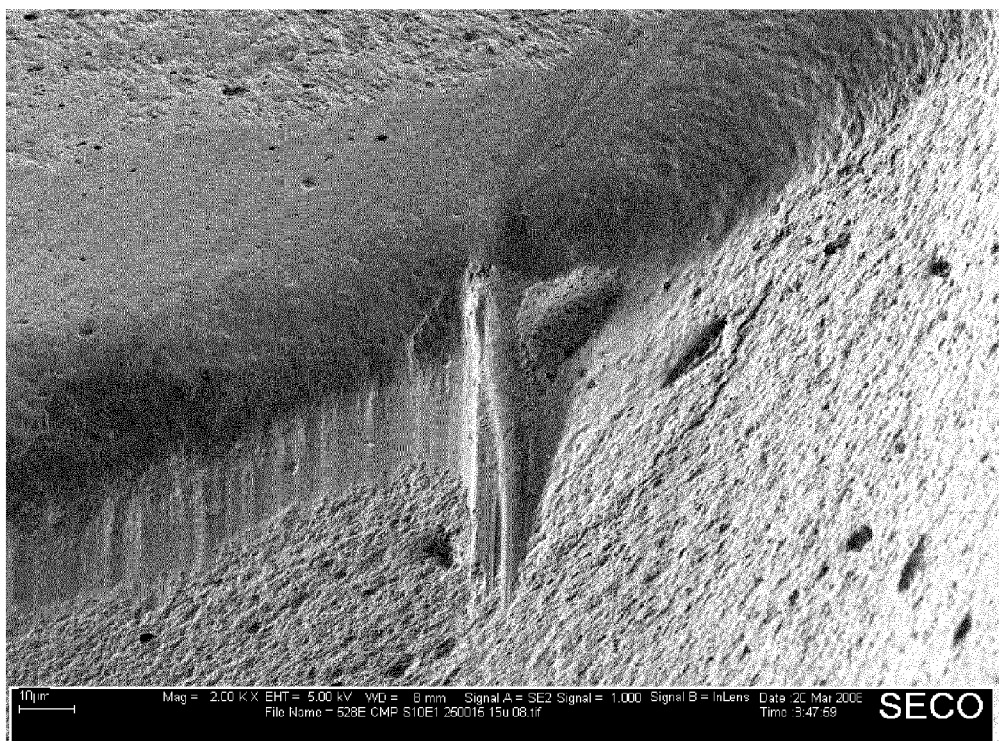
FIG. 2B is a microphotograph showing an insert having a 15 μm cutting edge radius at the end of the usable working portion of the cutting edge.

FIG. 2B shows an insert having a 15 μm cutting edge radius at the end of the maximum usable working portion of the cutting edge. Notch wear is visible as it appears at the point 33 between the material and the insert after 9.15 minutes. The notch width is 30 μm and notch length is 61 μm.

Figure 3:
FIG. 3 is a microphotograph showing an insert having a 30 μm cutting edge radius at the ends of the usable working portion of the cutting edge.

FIG. 3 shows an insert having a 30 μm cutting edge radius at the end of the usable working portion of the cutting edge. Notch wear is visible as it appears at the point 33 between the material and the insert after 9.15 minutes. The notch width is 25 μm and notch length is 67 μm.

Figure 4:
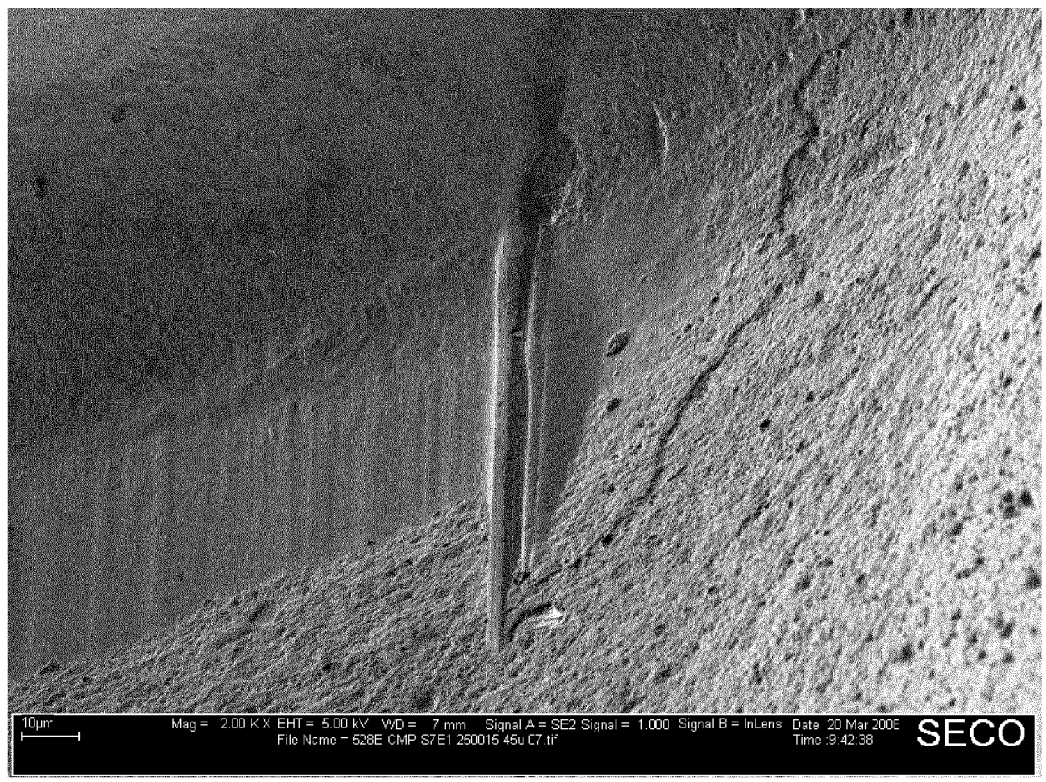
FIG. 4 is a microphotograph showing an insert having a 45 μm cutting edge radius at the end of the usable working portion of the cutting edge.

FIG. 4 shows an insert having a 45 μm cutting edge radii at the end of the usable working portion of the cutting edge. Notch wear is visible as it appears at the point 33 between the material and the insert after 9.15 minutes. The notch width is 22 μm and notch length is 75 μm.

As seen in FIG. 1A, the cutting insert 21 can comprise a plurality of cutting corners 35 and a plurality of cutting edges 29, with each cutting edge corresponding to a respective one of the cutting corners. The insert 21 can have additional corners without cutting edges. Each of the plurality of cutting edges 29 and respective cutting corners 35 can be, but need not be, identical. Each cutting corner 35 typically has at least one corner radius CR when the insert is viewed from above, however, the cutting corner may have plural radii between the points 31 and 33. For example, part or all of the cutting edge may be curved between the points 33 and 33.

Figure 5:
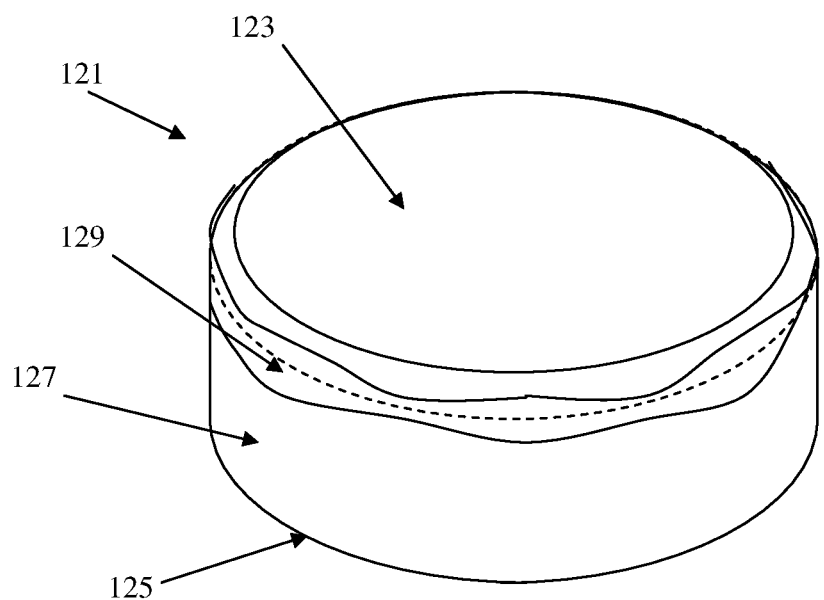
FIG. 5 is a perspective view of a circular cutting insert according to an aspect of the present invention.

As seen in FIG. 5, the cutting insert 121 can be a circular insert (when viewed from above the top surface 123 of the insert) with a single, continuous edge surface 127. One or more cutting edges 129 can be provided around the intersection of the edge surface 127 and the top surface 123 (and around the intersection of the edge surface and the bottom surface 125 for double-sided inserts).

Figure 6A:
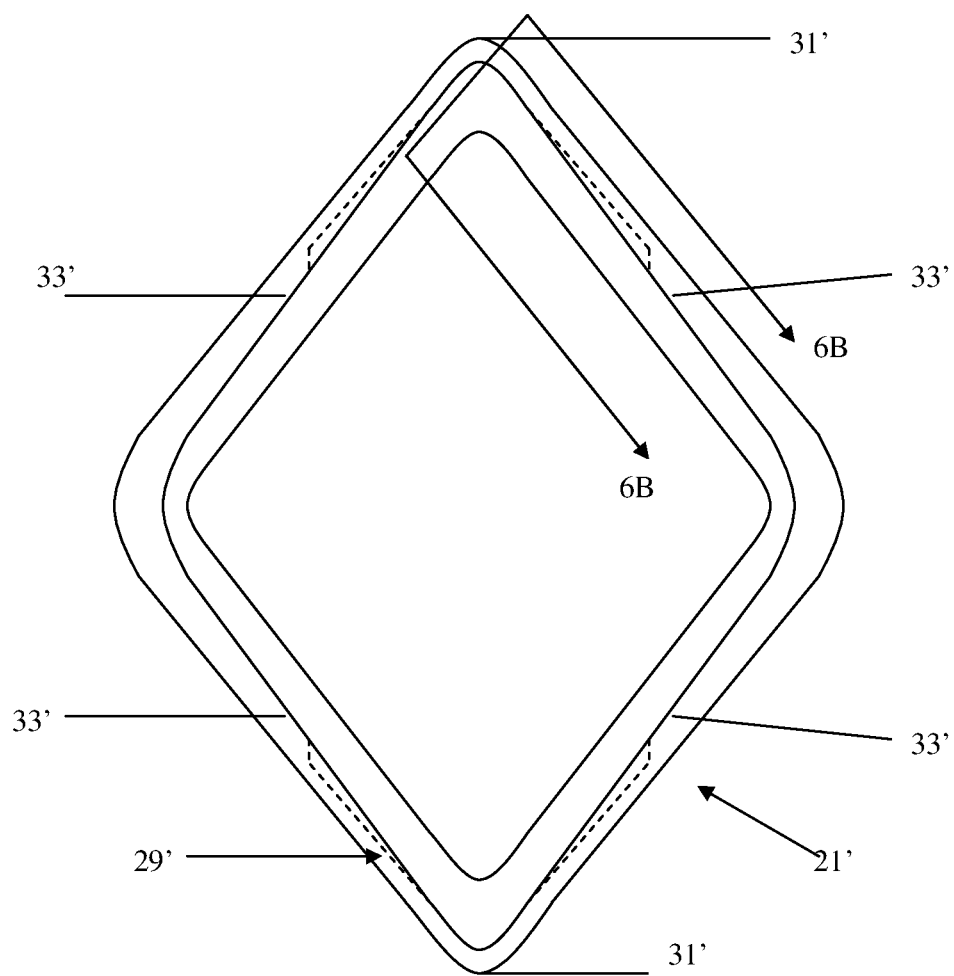
FIGS. 6A and 6B are a top view of a cutting insert according to an aspect of the present invention and a side, cross-sectional view taken at Section 6B-6B of the cutting insert of FIG. 6A, respectively.
Figure 6B:
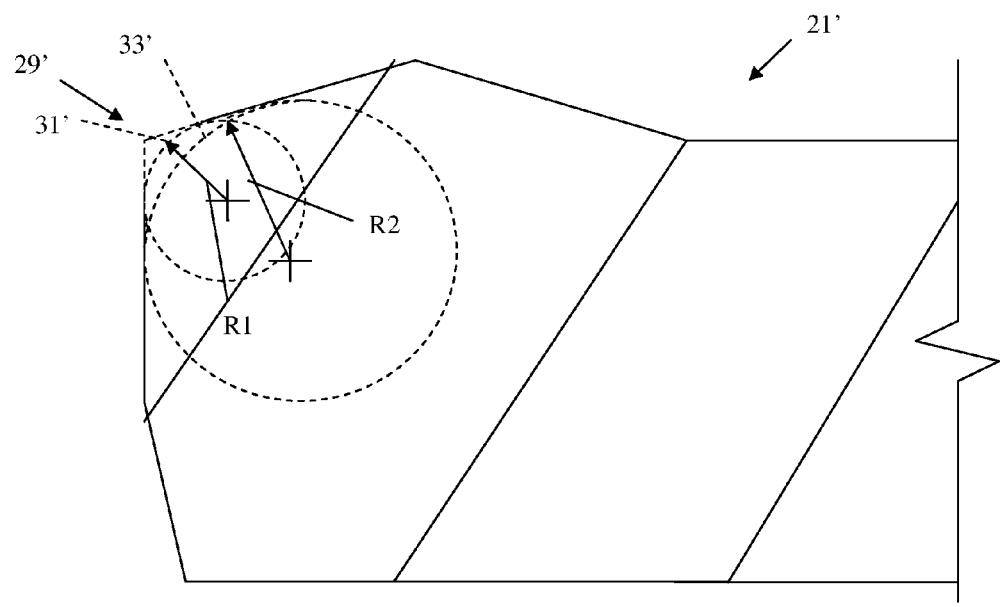

In the insert 21 shown in FIG. 1A, the first edge radius R1 is larger than the second edge radius R2. In the insert 21' shown in FIGS. 6A-6B, the first edge radius R1' at point 31' along the centerline CL of the cutting edge 29' is smaller than the second edge radius R2' (shown in phantom in FIG. 6B).

The edge radius of the cutting edge can vary between the first edge radius and the second edge radius. In the embodiments shown in FIGS. 1A-1B and 6A-6B, the edge radius of the cutting edge 29 and 29' varies continuously between the first edge radius and the second edge radius in the sense that the change in edge radius is gradual. The edge radius of the cutting edge can, however, vary discontinuously between the first edge radius and the second edge radius in the sense that the change from one radius to another can be rather abrupt or stepped.

FIG. 1B shows a surface adjacent to and behind the cutting edge 29 that is negatively angled with respect to a plane PB of the bottom surface 25 of the insert 21. It will be appreciated that the plane PB is merely a reference plane and the bottom surface 25 need not be a planar surface. The surface can be a land surface 37 that extends from the inner end 39 of the cutting edge 29 a limited distance inwardly from the edge surface 27 before transitioning to another surface, such as a chipbreaker surface, at a back end 43 of the land surface, although it is not necessary that a land surface be provided. The land surface 37 will ordinarily be distinct from an adjacent surface such as a chipbreaker surface in the sense that the land surface defines a non-zero angle with the adjacent surface and the transition from the land surface to the adjacent surface at the back end 43 of the land surface is detectable, such as by the naked eye or via measuring instruments commonly used for determining the geometry of small objects such as cutting inserts. The measuring instrument can be e.g. an optical microscope or SEM. The distance from the edge surface 27 to the back end 43 of the land surface 37 can vary, or can be constant. When the distance from the edge surface 27 to the back end 43 of the land surface 37 is constant along the cutting edge 29 between the points 33 and 33, the width WL1 of the land surface 37 from the inner end 39 of the cutting edge to the back end 43 of the land surface at the first point 31 at the center of the cutting edge is different than the width WL2 of the land surface behind the second points. In that case, when R1 at point 31 is greater than R2 at points 33, as in FIGS. 1A-1B, WL1 is less than WL2 and, when R1 at point 31 is less than R2 at points 33, as in FIGS. 6A-6B, WL1 is greater than WL2.

A wiper surface 45 can be provided below the cutting edge 29, extending from a bottom end 47 of the radius of the cutting edge to a bottom end 49 of the wiper surface. The distance of the wiper surface 45 from a reference plane PT of the top surface 23 to a bottom end 49 of the wiper can vary, or can be constant. When the distance from the plane PT of the top surface to the bottom end 49 of the wiper surface 45 is constant, the width WW1 of the wiper surface 45 from the bottom end 47 of the radius of the cutting edge to the bottom end 49 of the wiper surface below the first point 31 is different than the width WW2 of the wiper surface below the second points 33. In that case, when R1 at point 31 is greater than R2 at points 33, as in FIGS. 1A-1B, WW1 is less than WW2 and, when R1 at point 31 is less than R2 at points 33, as in FIGS. 6A-6B, WW1 is greater than WW2.

FIG. 1B shows a land surface 37 and a wiper surface 45 that form constant angles with some reference plane, such as the plane PB of the bottom surface 25. It will be appreciated that the angle of the land surface and the angle of the wiper surface with the reference plane can vary over the length of the cutting edge 29.

Figure 7:
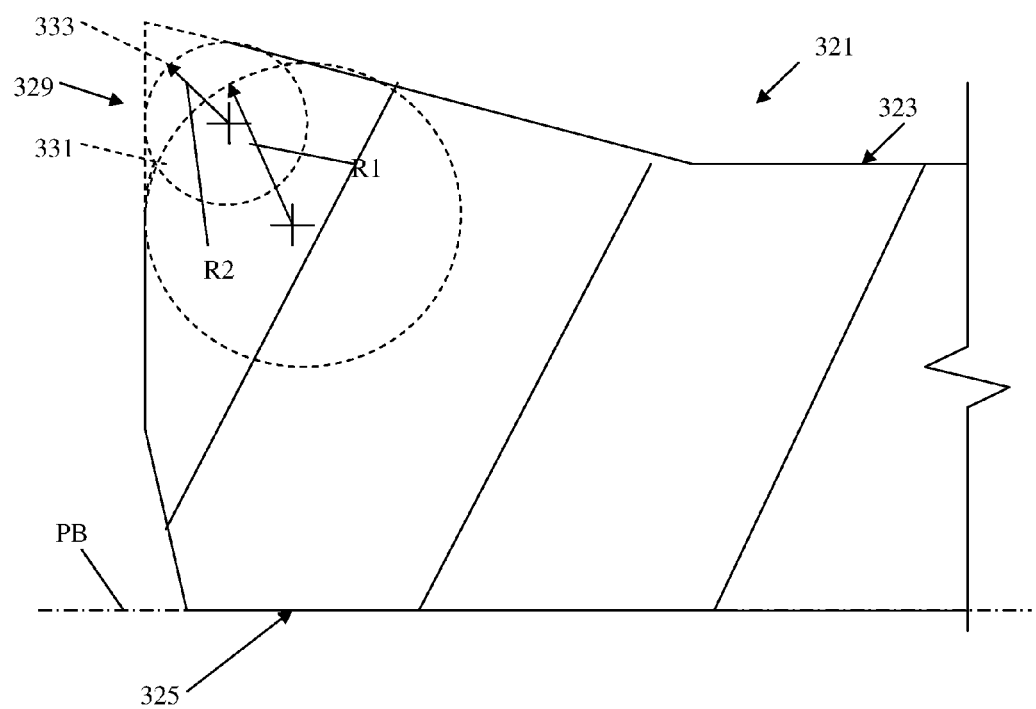
FIG. 7 is a side, cross-sectional view of an insert according to an aspect of the present invention.

While aspects of the present invention have been described primarily in terms of an insert with, as shown for example in FIG. 1B, a surface adjacent to and behind the cutting edge that is negatively angled with respect to a plane of the bottom surface of the insert, FIG. 7 shows that an insert 321 according to aspects of the present invention can have a surface, such as a top surface 323 or a land surface, adjacent to and behind the cutting edge 329 that is positively angled with respect to a reference plane PB of a bottom surface 325 of the insert. The insert can also have a surface adjacent to and behind the cutting edge that is parallel to a reference plane of the bottom surface of the insert.

Figure 8:
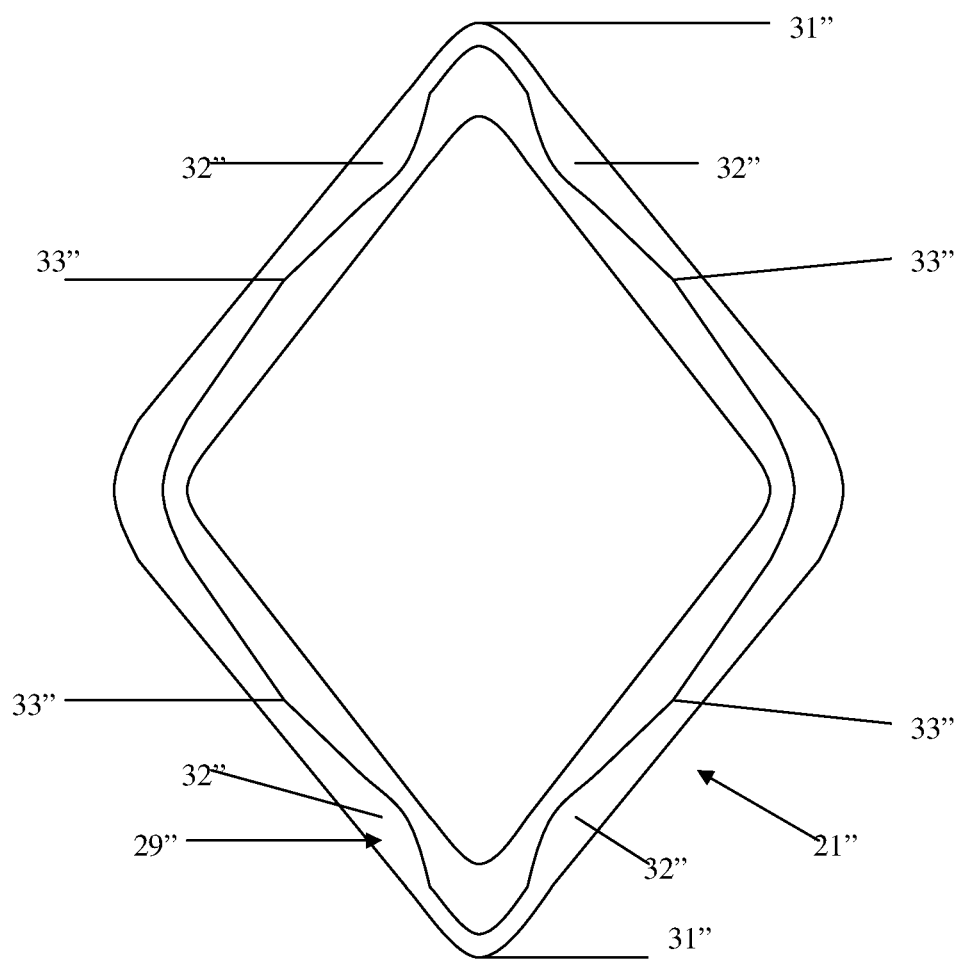
FIG. 8 is a top view of a cutting insert according to an aspect of the present invention.

While the invention has generally been described in terms of edge radii that vary up or down from the point 31 to the points 33, as seen in FIG. 8, an insert 21" can be provided wherein the edge radius of the cutting edge 29" can vary up (or down—not shown) from the point 31" to an intermediate point 32" between the point 31" and the points 33", and then vary down (or up—not shown) from the intermediate point 32" to the points 33". The edge radius at the points 31" and 33" may be the same as or different from each other, while the edge radius at the intermediate point 32" may be larger (or smaller—not shown) than the edge radii at the points 31" and 33".

The presently claimed cutting insert is most favorably used in fine turning of hard material workpieces with Rockwell C hardness values in the range of 45 to 65.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application No. 11153153.9, from which this application claims priority, are incorporated herein by reference.

What is claimed is:

1. A cutting insert comprising:
    a top surface;
    an edge surface;
    a cutting edge between the top surface and the edge surface, the cutting edge being symmetrical about a centerline, wherein the cutting edge has a first edge radius at a first point at the centerline of the cutting edge and a different, second edge radius at second points on opposite sides of and remote from the centerline of the cutting edge, the first edge radius being larger than the second edge radius, the top surface including a land surface between the cutting edge and a remaining portion of the top surface, the land surface defining a surface that is distinct from the remaining portion of the top surface, and in that a width of the land surface behind the cutting edge at the first point at the center of the cutting edge is different than the width of the land surface behind the second points.

2. The cutting insert as set forth in claim 1, wherein the insert further comprises a plurality of cutting corners and a plurality of cutting edges, each cutting edge corresponding to a respective one of the cutting corners.

3. The cutting insert as set forth in claim 2, wherein each of the plurality of cutting edges and respective cutting corners are identical.

4. The cutting insert as set forth in claim 1, wherein a maximum of the first edge radius is at least two times larger than a maximum of the second edge radius.

5. The cutting insert as set forth in claim 1, wherein an edge radius of the cutting edge varies between the first edge radius and the second edge radius.

6. The cutting insert as set forth in claim 5, wherein the edge radius of the cutting edge varies continuously between the first edge radius and the second edge radius.

7. The cutting insert as set forth in, claim 1, wherein the cutting insert is a double-sided insert having at least one cutting edge on a first side of the insert and at least one cutting edge on a second side of the insert.

8. The cutting insert as set forth in claim 1, wherein the insert further comprises a wiper surface below the cutting edge.

9. The cutting insert as set forth in claim 8, wherein a width of the wiper surface below the cutting edge at the first point at the center of the cutting edge is different than the width of the wiper surface below the second points.

10. The cutting insert as set forth in claim 1, wherein the cutting edge substantially defines an intersection between a top surface and an edge surface of the insert and includes at least one corner radius when the insert is viewed from above the top surface.

11. The cutting insert as set forth in claim 10 wherein the cutting insert is circular when viewed from above the top surface.

12. The cutting insert as set forth in claim 1, wherein a surface adjacent to and behind the cutting edge is negatively angled with respect to a reference plane of a bottom surface of the insert.

13. The cutting insert as set forth in claim 1, wherein a surface adjacent to and behind the cutting edge is positively angled with respect to a reference plane of a bottom surface of the insert.

\* \* \* \* \*